Figure 1:
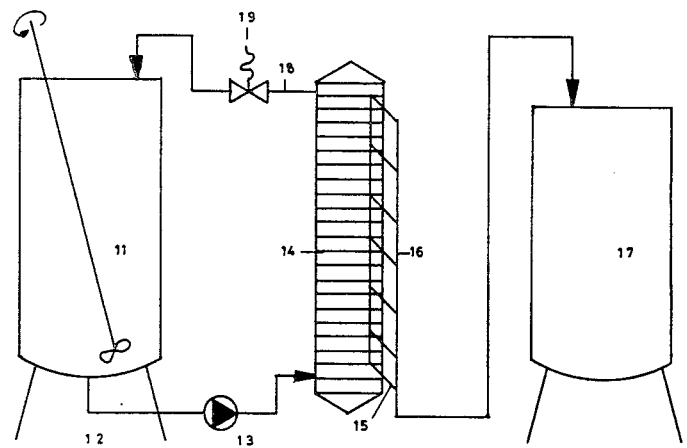

United States Patent [19]

Huster et al.

[11] 4,185,121

[45] Jan. 22, 1980

[54] PROCESS FOR THE TREATMENT OF AN ACID HYDROLYSATE OF VEGETABLE MATTER AND THE PRODUCTS OBTAINED

[75] Inventors: Lienhard B. Huster; Max Güggenbuhler, both of Winterthur, Switzerland

[73] Assignee: Societe d'Assistance Technique pour Produits Nestle S.A., Lausanne, Switzerland

[21] Appl. No.: 885,688

[22] Filed: Mar. 13, 1978

[30] Foreign Application Priority Data

Mar. 17, 1977 [CH] Switzerland ................ 3334/77

[51] Int. Cl.$^2$ .................. A23L 1/27; A23L 1/221
[52] U.S. Cl. ................... 426/250; 426/540; 426/656; 426/481; 426/495; 426/650
[58] Field of Search .......... 426/656, 540, 250, 650, 426/495, 533, 534, 481

[56] References Cited

U.S. PATENT DOCUMENTS

| | | | |
|---|---|---|---|
| 3,391,001 | 7/1968 | Sair | 426/656 |
| 3,622,556 | 11/1971 | O'Connor | 426/632 |
| 3,736,147 | 5/1973 | Iacobucci et al. | 426/271 |
| 3,929,890 | 12/1975 | Pfister | 426/656 |
| 4,018,752 | 4/1977 | Bühler et al. | 426/656 |

*Primary Examiner*—Jeanette M. Hunter
*Attorney, Agent, or Firm*—Watson, Leavenworth, Kelton & Taggart

[57] ABSTRACT

A process for the treatment of an acid hydrolysate of vegetable matter for separating it into a dark colored fraction and a light colored fraction is disclosed. In a turbulent flow, it is placed in contact with at least one semi-permeable membrane which is stable in an acidic medium under a pressure of from 4 to 50 kg/cm$^2$ which produces a first lightly colored liquid or permeate which passes through the membrane, the average color intensity of which, measured by its extinction, is about one tenth of that of the hydrolysate, and a second strongly colored liquid or retentate which does not pass through the membrane. The dried retentate is used as a seasoning and/or coloring agent.

19 Claims, 3 Drawing Figures

PROCESS FOR THE TREATMENT OF AN ACID HYDROLYSATE OF VEGETABLE MATTER AND THE PRODUCTS OBTAINED

The invention relates to the production of seasonings based on acid hydrolysates of vegetable matter rich in proteins and in carbohydrates.

It relates, in particular, to a process for the treatment of an acid hydrolysate of vegetable matter allowing the hydrolysate to be separated into a dark coloured fraction and a light coloured fraction.

The products derived from acid hydrolysis of vegetable matter have a dark brown colouring which is undesirable in certain applications. Attempts have therefore been made to bleach these products.

In conventional processes, the acid hydrolysates are bleached during industrial production of seasonings by means of activated charcoal, often by passing them several times in succession over activated charcoal as mentioned, for example, in French Pat. Nos. 1,218,831 (column 2, paragraph 2) or 2,095,510 (paragraph connecting pages 1 and 2).

The quantities of activated charcoal powder used are considerable and, since the charcoal consumed cannot be regenerated in good conditions, it must be burnt and thus constitutes a pollution factor.

In addition, a substantial amount of product is lost by adsorption on the charcoal. The charcoal also promotes selective adsorption of the amino acids, thus reducing the percentage of amino acids in the end product. Finally, the bleaching treatment is carried out discontinuously in a tank or over a column containing charcoal and involves a lot of handling.

The process according to the invention allows all these disadvantages to be overcome.

It is characterised in that an acid hydrolysate of vegetable matter in a turbulent flow is placed in contact with at least one semi-permeable membrane which is stable in an acidic medium under a pressure of from 4 to 50 kg/cm$^2$. A first slightly coloured or permeate liquid is produced which passes through the membrane and whose average colour intensity, measured by its extinction, is about one tenth of that of the hydrolysate, and a second strongly coloured or retenate liquid which does not pass through the membrane.

The products to be treated emanate from acid hydrolysis of any vegetable matter which is rich in proteins such as, for example, the proteins of leguminous plants, cereals and oil-seeds.

Hydrolysis is usually carried out in the presence of hydrochloric acid in a concentration of about 20% at a temperature of from 110° to 130° C. for five to eight hours. The mixture obtained is then neutralised by sodium hydroxide, filtered to eliminate the insoluble humins and, if necessary, evaporated to the desired concentration.

These hydrolysates are composed essentially of amino acids, sodium chloride and colouring compositions and have the following composition and properties:

total nitrogen: 2.8 to 3.5%
dry material: 40 to 50%
sodium chloride: 16 to 18%
extinction measured for a 10% solution in a 1 cm cell at a wave length of 525 nm 0.200 to 0.300.
pH: 5.0 to 5.4

The choice of the type of membrane used in the process according to the invention is not critical provided that they meet certain requirements of a technological nature such as, for example:
high rate of filtration
high homogeneity of porosity
high resistance to pressure
long life span at the pH for use.

Anisotropic membranes composed of cellulose acetate or any other suitable synthetic material may therefore be used. The usable membranes have a cutting zone preferably above 500 and below 50,000, that is to say they retain compounds having a molecular weight above 500 and below 50,000.

The optimum pressure may be evaluated for a given type of membrane in the concentration compartment. Attempts are made to maintain high turbulence so as to reduce the concentration of polarisation in the vicinity of the membrane. In practice, the flow of permeate usually begins to increase with the pressure and then to stabilize at a given value. It is therefore desirable to operate at pressures below the maximum value which allow a suitable flow-rate. According to the invention, the pressure is between 4 and 50 kg per cm$^2$ and preferably between 5 and 18 kg per cm$^2$.

The temperature also has an effect on the flow of permeate. An increase in the temperature causes a reduction in the viscosity of the supply product, an increase in the diameter of the pores and a reduction in the concentration of polarisation, thus leading to an increase in the flow-rate. According to the invention, the temperature is advantageously between 25° and 60° C. The process according to the invention may be carried out in any known apparatus of the tubular, hollow fibre, spiral or planar type, etc. These apparatus generally comprise:

a first so-called supply compartment which also acts as a concentration compartment,
means for producing rapid circulation of the fluids from this compartment which is obtained, for example, by producing recirculation,
an ultra-filtering membrane,
a second compartment for recovering the ultra-filtrate,
means for supplying the first compartment and for drawing-off in both compartments.

The apparatus used in the above examples are planar type apparatus. A module is composed of a pile of rigid superimposed or juxtaposed discs. The pile contains, alternately, a frame and a plate, separated by a semi-permeable membrane. Each plate is hollow and communicates with the exterior at its periphery by means of a small nozzle. The liquid, under pressure, is introduced at one end of the apparatus, travels through the pile and is collected at the other end while the ultra-filtrate is collected by the small nozzles of the hollow plate discs.

The process according to the invention may be carried out in different ways. The attached drawings, given by way of example, illustrate diagrammatically preferred embodiments.

Figure 2:
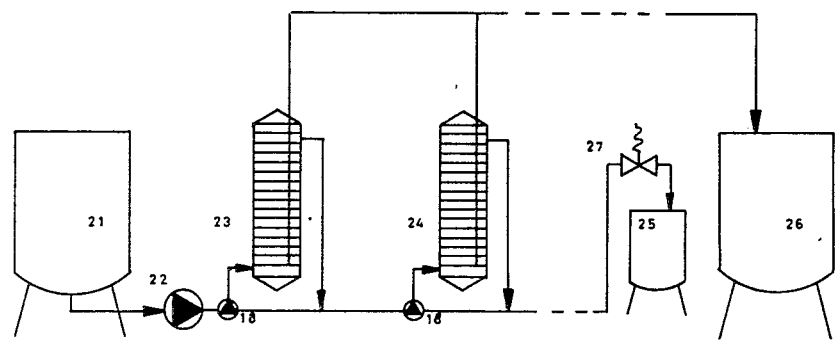
Figure 3:
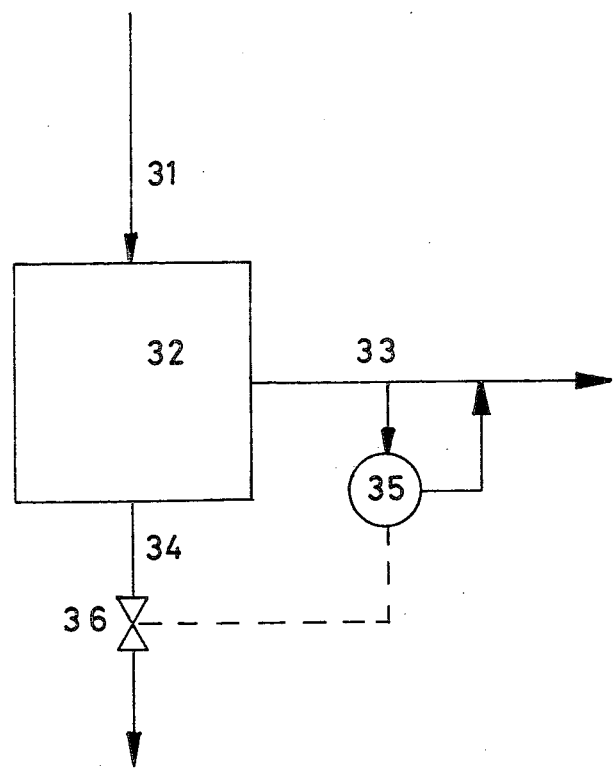

FIG. 1 shows an installation comprising a module.
FIG. 2 shows an arrangement of several modules in a line.
FIG. 3 illustrates a device for continuously monitoring the colouring of the permeate.

In a first embodiment, carried out discontinuously, the batch of product to be treated is introduced into a supply tank on the semi-permeable membrane, the permeate is collected in a storage tank and the retentate is periodically evacuated into a storage tank until the charge is exhausted.

A second embodiment, carried out continuously, which is preferred, is shown in FIG. 1. The product to be treated passes from the supply tank 11 through the inlet pipe 12 and the pump 13 into the module 14. The permeate is evacuated through the various nozzles 15 connected to the collector tube 16 into the storage tank 17. The retentate is recycled to the supply tank 11 via a reflux pipe 18 provided with an adjustable feed-check valve 19 for regulating the flow of retentate. The product to be treated concentrates with colouring and the process may be continued until the charge is exhausted.

Although the above apparatus only comprise a single module, it is often desirable to increase the useful surface of membrane and hence the effectiveness of the treatment because the number of modules used for a given quantity of product to be treated depends upon the available surface area of membrane per module. The modules may be arranged parallel so that the charge current penetrates all the modules simultaneously or in series, so that the concentrated material or retentate from a first module constitutes the charge of a second module and so on. A battery of modules may also be formed from a combination of these two arrangements, in which case a first group of several modules in parallel is connected in series to a second group. A preferred line is shown diagrammatically in FIG. 2. It comprises a supply tank 21, a feed pump 22, a group of modules 23 and 24, arranged in series, a retentate storage tank 25, a permeate storage tank 26, means for controlling the flow-rate and pressure 27. Circulation pumps 28 are also provided along the line.

It is also possible to provide a first line of modules provided with membranes having characteristics which lead to a permeate of a first colour and a second line of modules provided with membranes having characteristics leading to a permeate of a second colour, and to subsequently mix the two permeates so as to obtain a desired end product of an intermediate colour.

When the process is carried out, in particular, continuously, it is particularly advantageous to monitor the colour of the permeate continuously. This monitoring may be carried out simply by means of the assembly shown in FIG. 3. The flow of product to be treated 31 passes through the ultrafiltration modules 32 whence issue the flow of permeate 33 and the flow of retentate 34. The colouring of the permeate is given a desired value (given by its extinction), a proportion of the permeate is passed through the cell of a colorimeter 35 and the measured value of extinction is compared with the desired value. Any difference of extinction is then corrected by modifying the retentate-permeate ratio by subjecting a valve 36 located on the retentate outlet pipe to the variations in this parameter.

In fact, the flow of permeate has a value which is predetermined by the composition of the product to be treated, the properties of the membrane, the pressure and the temperature in the concentration compartment. The modification in the retentate-permeate ratio is thus obtained by varying the quantity of retentate leaving the apparatus.

The process according to the invention leads to two fractions of different quality and quantity:

A main product composed of the permeate. This product has a composition of amino acids, sodium chloride and water which is identical to that of the starting hydrolysate but which is bleached to a certain extent depending upon the conditions of the process.

A secondary product constituted by the retentate, the sodium chloride and water composition of which is identical to that of the starting hydrolysate. It is slightly enriched in aspartic acid, glutamic acid, and in tyrosine and is of a stronger colour.

Generally speaking, it is desirable to collect the greatest possible quantity of permeate in relation to the quantity of hydrolysate treated. However, ultrafiltration may be stopped at any value of the concentration factor K defined as the ratio between the quantity of hydrolysate treated and the quantity of retentate obtained. If ultrafiltration is carried out for a sufficiently long period, a K factor having a value of about 20 may be obtained.

The retentate may be used directly in certain products in which its dark brown colouring is of no consequence. However, if the quantity obtained is greater than necessary, it is possible to isolate the colourant by removing all the amino acids and sodium chloride from the concentrate by diafiltration. In order to do this, the ultra-filtration installation is supplied with a mixture of hydrolysate and water until the retentate is concentrated.

The same quantity of water is then added to this and diafiltration is recommenced. After several successive washing treatments or a counter-current washing treatment, the product obtained contains hardly any hydrolysate. The colouring agent may then be dried, for example by atomisation.

This dark brown colourant may be used, for example, as a colouring agent as a replacement for the caramel colourant.

The permeate and retentate obtained may be partially or completely evaporated and dried and may be presented in the form of a paste or dry powder. The drying operation may be carried out advantageously under vacuum. However, other methods may be adopted, for example drying on a mat, by atomisation, cryodessication, etc. The dried product is then ground into powder form.

Whatever the form of the end product, it may be incorporated into food products such as soups, sauces, condiments, stock, etc.

The following examples illustrate the way in which the process according to the invention is carried out but the process is not limited to the conditions described therein.

The parts and percentages are values by weight unless otherwise stated.

EXAMPLE 1

In this example and in the following examples, the properties of the products are determined as follows:
the nitrogen (N) content is obtained by the Kjeldahl method,
the content of dry materials (TS) is evaluated by drying the sample under vacuum for 4 hours at 70° C. over phosphorus pentoxide,
the extinction E is measured by diluting one volume of sample in nine volumes of water in a 1 cm cell at a wavelength of 525 nm.

The treated hydrolysate has the following properties:
N: 2.9%
TS: 44%
NaCl: 18%
extinction: 0.300 pH: 5.2

Using a DDS (De Danske Sukkerfabrikker) laboratory module provided with a 0.36 m² membrane of the 800 type with the structure in FIG. 1, 20 kg of filtered hydrolysate defined above are introduced into a supply container provided with a heat exchanger, the temperature is kept at 22° C. and ultra-filtration is carried out for 30 minutes with a total return of the permeate. The pressure is then regulated by means of the valve 19 (FIG. 1) and ultra-filtration is carried out with return of the permeate for 30 minutes, keeping the temperature at 22° C. After this equilibrium operation, the flow of permeate is measured and a sample of permeate is analysed (P-0). Collection of the permeate in the storage container 17 then begins. A sample is analysed after each 2 liters of permeate has passed and the operation is stopped once the concentration reaches the desired value of the concentration factor K. The results obtained are summarised in the table below.

TABLE 1

K = 10.0
flow rate 8 l/minute
pressure 20 kg/cm²

| Sample after passage of the permeate (l) | N% | TS% | Yield of Permeate (kg/m²/h) | E |
|---|---|---|---|---|
| 0 | 2.8 | 42 | 12.1 | 0.090 |
| 1 | 2.7 | 42 | 11.1 | 0.090 |
| 2 | 2.8 | 42 | 10.3 | 0.080 |
| 4 | 2.7 | 42 | 9.7 | 0.074 |
| 8 | 2.7 | 40 | 8.3 | 0.080 |
| 12 | 2.8 | 40 | 8.1 | 0.100 |
| 14 | 2.8 | 39 | 7.8 | 0.130 |
| 15 | 2.6 | 40 | 7.3 | 0.150 |
| permeate (average) | 2.7 | 40 | total 18.0 kg | 0.084 |
| retentate (average) | 3.3 | 43 | total 2.0 kg | 2.20 |

The retentate contains 74% of colouring agent and 26% of this is present in the permeate. The yield of average permeate is 9.1 kg/m²/h.

EXAMPLE 2

The operations described in Example 1 are repeated under the following conditions:
membrane 865, ultrafiltration until K=14.2
flow rate 8 l/min
temperature 22° C.
pressure 40 kg/cm²

The results obtained are summarised in the following table:

TABLE 2

| Sample after passage of the permeate (l) | N% | TS% | Yield of permeate (kg/m²/h) | E |
|---|---|---|---|---|
| 0 | 2.1 | 35 | 2.28 | 0.030 |
| 2 | 2.1 | 34 | 1.75 | 0.20 |
| 4 | 2.1 | 34 | 1.73 | 0.020 |
| 13 | 2.3 | 33 | 1.42 | 0.040 |
| 15 | 2.8 | 36 | 1.00 | 0.080 |
| permeate (average) | 2.1 | 36 | total 18.4 kg | 0.030 |
| retentate (average) | 3.9 | 44 | total 1.4 kg | 3.00 |

The retentate contains 88% of the colouring agent and the permeate contains 12% of colouring agent.
The average yield of permeate is 1.65 kg/m²/h.

EXAMPLE 3

In order to examine the effect of the operating pressure for a given membrane on the yield of permeate, the following process is adopted:

The supply tank is filled with about 20 kg of hydrolysate at a given temperature and the desired pressure and flow-rate are fixed, beginning with the lowest pressure value. The DDS module in Example 1 is supplied with total return of the permeate until equilibrium is reached.

The yield of permeate is then measured and samples thereof are analysed.

The preceding operations are recommenced with the higher value which follows on the pressure scale.

In order to obtain values for different K, the permeate is collected until the desired value of K is reached and the series of operations above is recommenced. The results obtained with the membranes 800 and 865 are shown in Tables 3 and 4 below.

TABLE 3 membrane 800
temperature of the hydrolysate 20° C.
flow rate 8 l/min at 20° C.

| K | Pressure kg/cm² | Yield of Permeate (kg/m²/h) | N% | TS% | FF |
|---|---|---|---|---|---|
| 1 | 7 | 12.8 | 2.9 | 44 | 0.168 |
|  | 10 | 15.2 | 2.9 | 44 | 0.160 |
|  | 12 | 16.8 | 3.0 | 44 | 0.150 |
|  | 14 | 18.3 | 2.9 | 44 | 0.140 |
|  | 16 | 19.5 | 2.8 | 45 | 0.128 |
|  | 19 | 19.3 | 2.8 | 44 | 0.110 |
|  | 21 | 18.7 | 2.8 | 43 | 0.100 |
| 1 | 23 | 17.5 | 2.7 | 43 | 0.090 |
|  | 25 | 17.3 | 2.7 | 43 | 0.084 |
| 2.5 | 10 | 7.67 | 2.9 | 43 | 0.114 |
|  | 14 | 9.67 | 2.9 | — | 0.134 |
|  | 17 | 10.7 | 2.8 | 42 | 0.120 |
|  | 21 | 10.8 | 2.7 | — | 0.100 |

The maximum yield of permeate is obtained at a pressure of about 16 to 17 bar.

TABLE 4 membrane 865
temperature 23° C.
flow rate 8 l/min at 20° C.

| K | Pressure kg/cm² | Yield of permeate (kg/m²/h) | N% | TS% | E |
|---|---|---|---|---|---|
| 1 | 27 | 2.08 | 2.4 | 41 | 0.042 |
|  | 31 | 2.50 | 2.3 | 40 | 0.040 |
|  | 36 | 2.83 | 2.3 | 39 | 0.040 |
|  | 42 | 3.00 | 2.2 | 38 | 0.032 |
|  | 47 | 3.21 | 2.2 | 38 | 0.032 |
|  | 52 | 3.46 | 2.1 | 37 | 0.030 |
|  | 56 | 3.63 | 2.1 | 37 | 0.030 |
|  | 30 | 2.87 | — | — | — |
|  | 36 | 3.40 | 2.3 | 39 | 0.035 |
|  | 39 | 3.43 | 2.2 | 39 | 0.033 |
|  | 43 | 3.60 | 2.1 | — | 0.032 |
|  | 45 | 3.37 | 2.1 | 38 | 0.029 |
|  | 50 | 3.63 | 2.0 | — | 0.025 |

It is noted that the maximum yield of permeate is not reached at 49 kg/cm². However, a lower pressure is advantageously selected so as not to tire the membrane.

EXAMPLE 4

In order to determine the effect of temperature on the yield of permeate, the pressure, inlet flow rate and desired temperature are fixed and the yield of permeate is then measured after reaching equilibrium operation.

The results obtained with an 865 membrane using the DDS module from Example 1 are shown in Table 5 below.

TABLE 5 flow rate 8.5 l/min
pressure 40 kg/cm²

| Temperature °C. | Yield of permeate kg/m²/h |
|---|---|
| 21 | 1.76 |
| 22 | 1.90 |
| 27 | 2.31 |
| 29 | 2.43 |

An increase in the flow of permeate of 4.6%/°C. (based on 21° C.) is observed.

EXAMPLE 5

Using the DDS module in Example 1, 85 kg of hydrolysate filtered on an 865 membrane are diafiltered with continuous addition of 65 kg of water until a concentration factor of about 18 is reached. 4.6 kg of retentate are thus obtained to which are added the same quantity of water and diafiltration is recorded four times. 2.7 kg of final retentate (retentate IV) which is practically free from hydrolysate is thus obtained and is dried by atomisation. Analysis of the starting hydrolysate, the permeate and the retentate from each stage of the diafiltrate process gives the results shown in Table 6 below.

TABLE 6

Flow of permeate 8 l/min at 20°-23° C.
Pressure 42 kg/cm²

| | | N% | TS% | NaCl | E |
|---|---|---|---|---|---|
| ultra-fil-tration | 85 kg of hydrolysate+ 60 kg of ↓ water | 3.0 | 45 | 18.6 | 0.236 |
| | 140 kg of permeate+ | 1.6 | 26 | — | 0.050 |
| | 4.6 kg of retentate A | 3.1 | 32 | — | 0.60* |
| Wash I | 4.6 kg of retentate A+ 4.6 kg of ↓ water | | | | |
| | 6.5 kg of permeate+ | 0.7 | 7.3 | 1.1 | 0.040 |
| | 2.7 kg of retentate I | 3.3 | 33.4 | 0.7 | 1.00* |
| Wash II | 2.7 kg of retentate I+ 2.7 kg of ↓ water | | | | |
| | 2.9 kg of permeate + | 0.5 | 5.3 | 0.4 | 0.038 |
| | 2.9 kg of retentate II | — | — | — | — |
| Wash III | 2.9 kg retentate II+ 2.9 kg of ↓ water | | | | |
| | 3.0 kg of permeate + | 0.3 | 3.1 | 0.1 | 0.022 |
| | 2.8 kg of retentate III | — | — | — | — |
| Wash IV | 2.8 kg of retentate III+ 2.8 kg of ↓ water | | | | |
| | 3.1 kg of permeate + | 0.2 | 2.2 | 0.04 | 0.018 |
| | 2.7 kg of retentate IV | 2.8 | 27.3 | 0.04 | 1.3* |
| dry colouring agent | | 10.4 | — | 0.6 | — |

*extinction measured with a 1% solution instead of a 10% solution.

EXAMPLE 6

The operations described in Example 1 are repeated under the following conditions:
Membrane GR 8 P, ultrafiltration until K=10
flow rate 8 l/min.
Temperature 20-22° C.
Pressure 9 kg/cm²
The results obtained are summarised in the following table:

| Sample after time (h) | Yield of (kg/m²/h) | E |
|---|---|---|
| 0 | 11.2 | 0.11 |
| 2 | 10.5 | 0.11 |
| 4 | 9.1 | 0.11 |
| 6 | 7.3 | 0.13 |
| 8 | 5.4 | 0.15 |
| Permeate (average) total | 28.0 kg | 0.12 |
| retentate (average) total | 3.0 kg | 1.30 |

The retentate contains 60% of colouring agent and 40% of colouring agent is present in the permeate. The average yield of permeate is 9.5 kg/m²/h.

The products in examples 1,2,5 and 6 (800, 865 and GR 8 P type membranes respectively), have been tested organoleptically as follows:

1. The permeates from the examples were compared with typical hydrolysate bleached on activated carbon. To do this, one liter of hot water was poured over 20 ml of each sample. The three samples have a neutral taste, a complete flavour, ample, equivalent to the control sample.

2. The retentates (concentrates) of the examples tested were compared as above. The samples have a slight taste of flavouring, an attractive profile.

3. One liter of hot water was poured on to 1 g of colouring agent from example 5. The product has a passably neutral taste, a slight flavour of spice.

We claim:

1. A process for the treatment of an acid hydrolysate of vegetable matter for separating the hydrolysate into a dark coloured fraction and a light coloured fraction comprising contacting the hydrolysate with at least one semi-permeable membrane which is stable in an acidic medium under a pressure of from 4 to 50 Kg/cm² which produces a first lightly coloured liquid or permeate which passes through the membrane, the average colour intensity of which, measured by its extinction, is about one tenth of that of the hydrolysate, and a second strongly coloured liquid or retentate which does not pass through the membrane.

2. A process according to claim 1, wherein the acid hydrolysate of vegetable matter treated is rich in proteins, the nitrogen content of which is from 2.8 to 3.5%, the quantity of dry materials is from 40 to 50%, the quantity of sodium chloride is from 16 to 18%, the pH from 5.0 to 5.4 and the extinction, measured for a 10% solution at a wavelength of 525 nm is from 0.200 to 0.300.

3. A process according to claim 1, wherein the pressure is between 5 and 18 kg/cm².

4. A process according to claim 1, wherein the process is carried out at a temperature of between 25° and 60° C.

5. A process according to claim 1, wherein the semi-permeable membrane has a cutting zone of from 500 to 50,000.

6. A process according to claim 1, wherein the hydrolysate is introduced from a supply tank into an ultrafiltration unit, the permeate is evacuated into a storage tank and the retentate is evacuated into a storage tank.

7. A process according to claim 6, wherein the treatment is carried out continuously by introducing the hydrolysate into an ultra-filtration unit, evacuating the permeate into a storage tank and recycling the retentate into the supply tank until the charge is exhausted.

8. A process according to claims 6 or 7, wherein the ultra-filtration unit comprises 2 or more modules mounted in such a way that the hydrolysate to be treated passes into the modules simultaneously and/or successively.

9. A process according to claim 6 in which the colouring of the permeate having a desired value as given by its extinction is monitored continuously by, passing at least a proportion of the permeate through the cell of a colorimeter, in which the measured extinction value is compared with the desired value and any difference of extinction is corrected by modifying the retentate-permeate ratio.

10. A process according to claim 9, wherein the retentate-permeate ratio is modified by acting on the flow of retentate by subjecting a valve situated in the retentate outlet pipe to the variations in the extinction.

11. A process according to claim 1, wherein the permeate is concentrated to a paste.

12. A process according to claim 1, wherein the permeate is dried to a powder.

13. A process according to claim 1, wherein the retentate is concentrated to a paste.

14. A process according to claim 1, wherein the retentate is dried to a powder.

15. A process according to claim 1, wherein ultra-filtration of a mixture of the hydrolysate and water is carried out, by adding a fresh quantity of water to the retentate obtained and repeating the ultra-filtration until a colouring agent practically free from hydrolysate is isolated.

16. A process according to claim 15, characterised in that the colouring agent is dried.

17. A product obtained by carrying out the process according to one of claims 11, 12, 13, 14 or 16.

18. A seasoning obtained by the process of claim 1.

19. A food colouring agent obtained by the process of claim 15.

* * * * *

UNITED STATES PATENT AND TRADEMARK OFFICE
CERTIFICATE OF CORRECTION

PATENT NO. : 4,185,121

DATED : January 22, 1980

INVENTOR(S) : Lienhard B. Huster and Max Guggenbuhler

It is certified that error appears in the above-identified patent and that said Letters Patent are hereby corrected as shown below:

Col. 5, Table 2, under the heading "E", the second entry thereunder "0.20" should read -- 0.020 --.

Col. 6, Table 3, the last heading "FF" should read -- E --.

Col. 6, Table 3, under the heading "TS%", the fifth entry thereunder "45" should read -- 43 --.

Col. 6, Table 4, corresponding to the value of "30" under the heading "Pressure", under the heading "K", insert a K value of -- 2 --.

Col. 7, in the Table appearing in Example 6, the second heading "Yield of" should read -- Yield of Permeate --.

Col. 8, in the Table, the second heading "Yield of" should read -- Yield of Permeate --.

Signed and Sealed this

Sixth Day of May 1980

[SEAL]

Attest:

Attesting Officer

SIDNEY A. DIAMOND

Commissioner of Patents and Trademarks